Jan. 20, 1931. G. D. SUNDSTRAND 1,789,886
FEEDING MECHANISM FOR MACHINE TOOLS
Filed Oct. 25, 1928  3 Sheets-Sheet 1
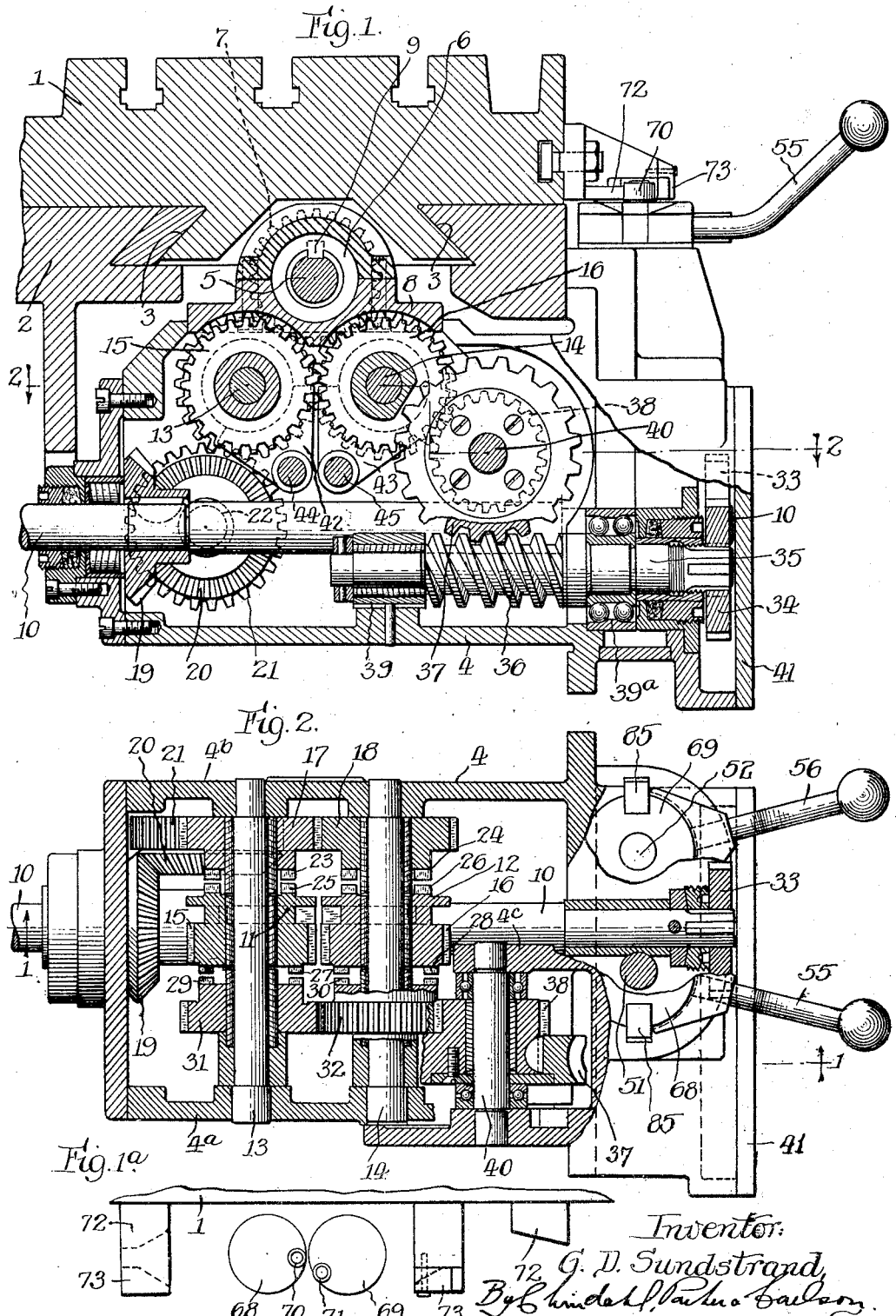

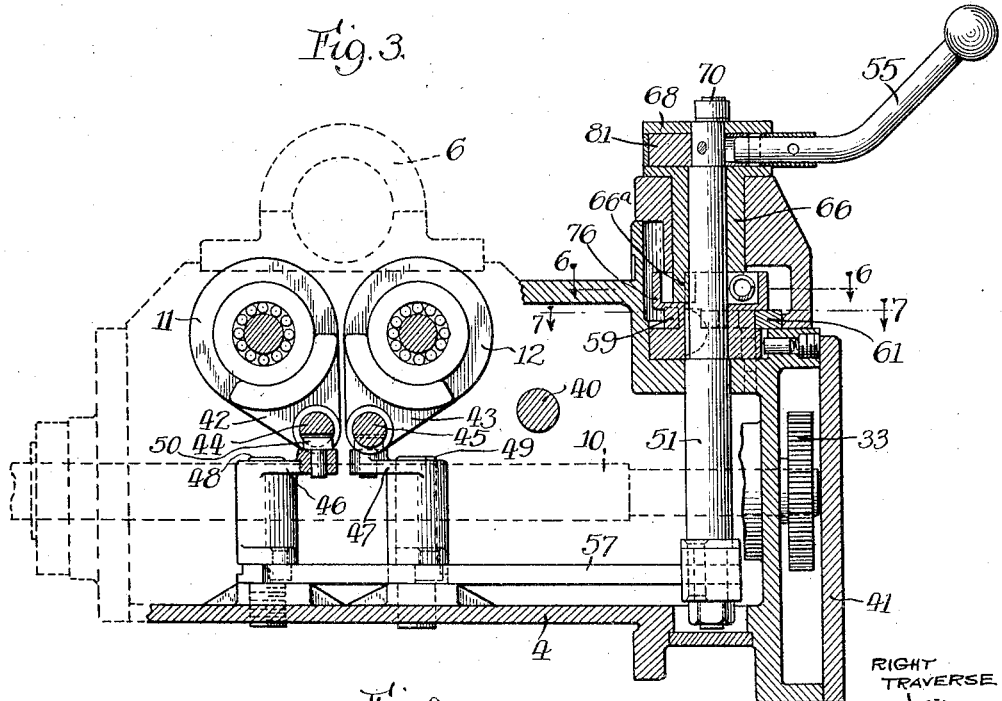
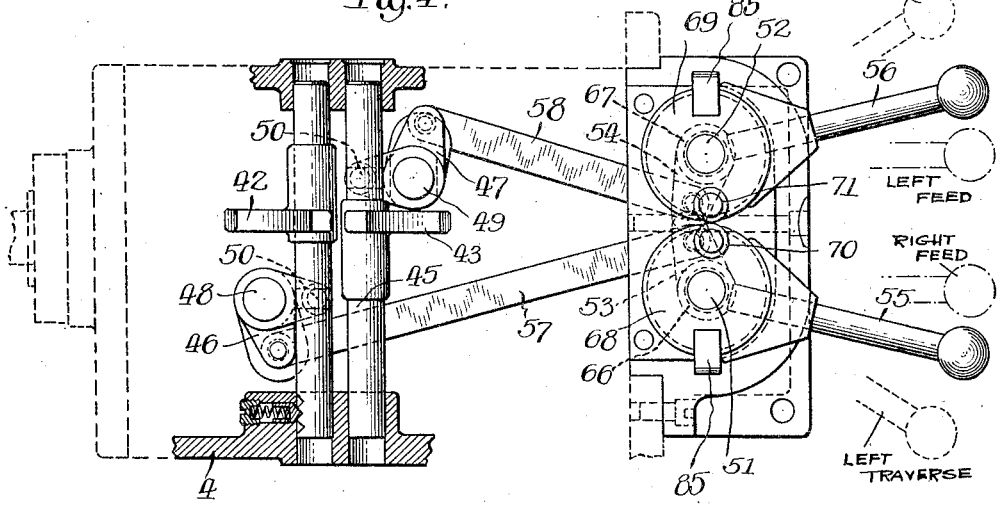

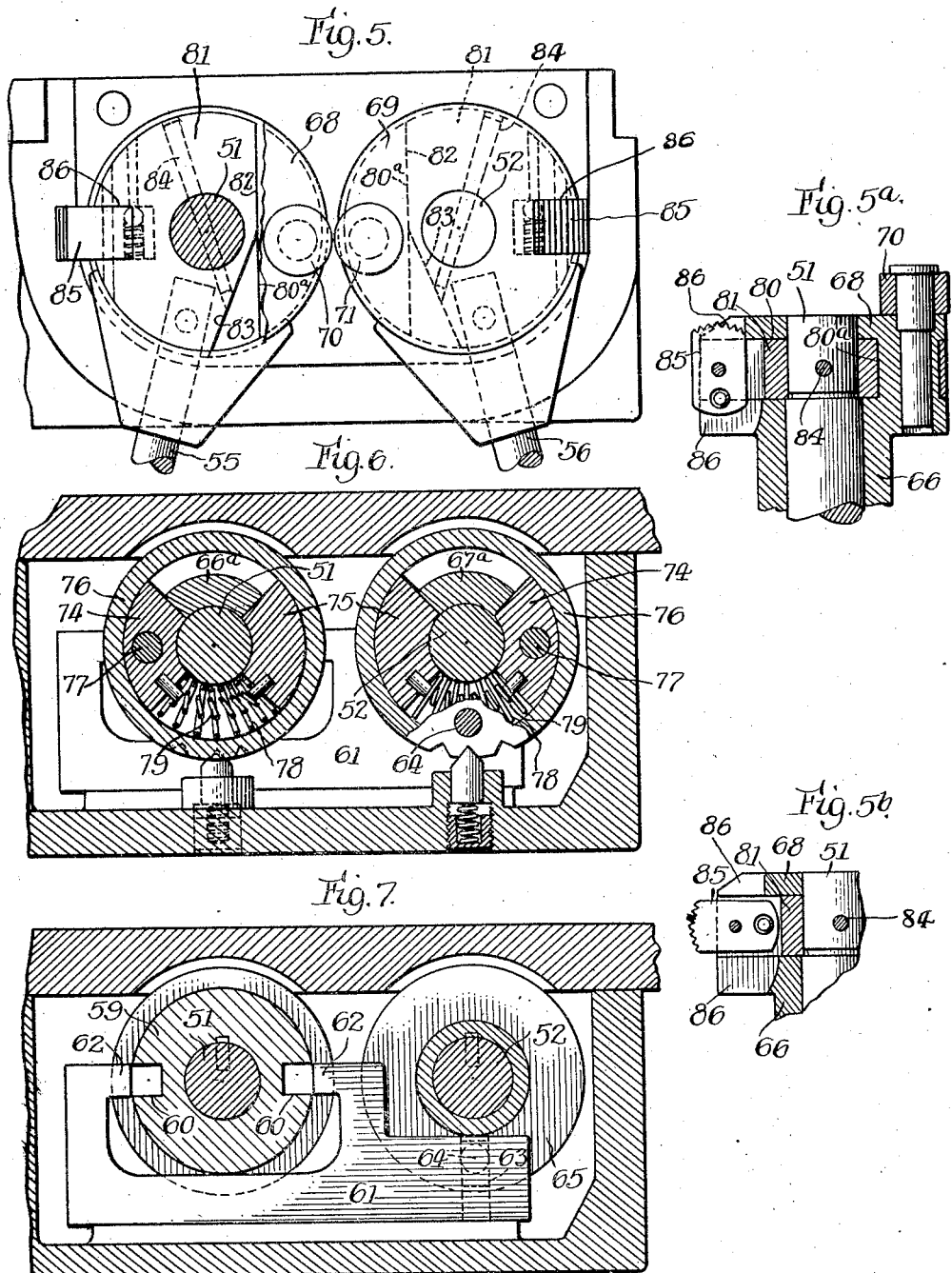

Patented Jan. 20, 1931

1,789,886

UNITED STATES PATENT OFFICE

GUSTAF DAVID SUNDSTRAND, OF ROCKFORD, ILLINOIS, ASSIGNOR TO SUNDSTRAND MACHINE TOOL CO., OF ROCKFORD, ILLINOIS, A CORPORATION OF ILLINOIS

FEEDING MECHANISM FOR MACHINE TOOLS

Application filed October 25, 1928. Serial No. 314,923.

The invention relates generally to feeding mechanisms for movable tool or work supports and more particularly to an improved mechanism for actuating and controlling the movements of the tool or work support in a machine tool.

It is the general object of the invention to provide a new and improved mechanism of simplified construction arranged to actuate such a support at "feed" and "traverse" speeds in forward and reverse directions.

It is another object of the invention to provide such a mechanism with improved and simplified control devices.

Another object is to provide a feeding mechanism embodying a pair of feed-traverse clutches together with operating levers for said clutches and a simplified trip dog mechanism arranged to actuate the clutches automatically.

Another object is to provide a simplified feed mechanism embodying a pair of control devices together with trip dogs movable with the support arranged to actuate either device.

In pursuance of the foregoing and other objects, the present embodiment consists of a feed mechanism for a movable support embodying a pair of feed-traverse clutches, a pair of control devices for said clutches interlocked to permit engagement of but one clutch at a time and trip devices movable with the support arranged to actuate the control device of the clutch then engaged.

Further objects and advantages of the invention will be understood from the following detailed description taken in connection with the accompanying drawings which form a part of this specification and in which:

Fig. 1 is a vertical section through a feeding mechanism embodying the preferred form of the invention, mounted in operative relation and immediately below a movable work support such as the table of a milling machine, the view being approximately along the line 1—1 of Fig. 2.

Fig. 1ª is a plan view illustrating diagrammatically types of dogs for actuating the controls.

Fig. 2 is a plan view partly in section along the line 2—2 of Fig. 1.

Fig. 3 is an elevation of the clutch control devices shown in Fig. 4.

Fig. 4 is a plan view of the clutch control devices shown in Fig. 3.

Fig. 5 is an enlarged fragmental plan view of a portion of the control mechanism.

Figs. 5ª and 5ᵇ are fragmentary views of the control mechanism.

Fig. 6 is a section through the control mechanism along the lines 6—6 of Fig. 3.

Fig. 7 is a section through the control mechanism along the line 7—7 of Fig. 3 showing the interlocking device for the clutches.

While the invention is susceptible of embodiment in many different forms, there is shown in the drawings and will herein be described in detail one such embodiment, with the understanding that the present disclosure is to be considered as an exemplification of the principles of the invention, and is not intended to limit the invention to the embodiment illustrated. The scope of the invention will be pointed out in the appended claims.

As illustrated in the drawings, the preferred form of the invention is disclosed in operative relation with a work support or table 1 of a milling machine, which table is slidably mounted upon a base or bed 2 to move along ways 3. The feeding mechanism proper, that is the feed-traverse clutches and gearing, is embodied in a feed box or housing 4 suitably secured to the bed of the machine in a position directly beneath the table 1 with the forward portion of the box extending beyond the bed so as to provide for the mounting of the control mechanism as hereinafter described. The feed mechanism is preferably mounted in this manner so as to permit the mechanism as a unit to be assembled separately from the machine and then to be attached thereto, and also to permit of removal of the unit if desired.

As illustrated herein, the table 1 is arranged to be reciprocated by means of a feed screw 5 traveling with the table and rotatably mounted thereon, said screw engaging a stationary nut which is located in a split box or housing 6 that is secured to the upper portion of the feed box 4. A gear 7 rotatably mounted within the housing 8 has a splined connection 9 with the feed screw 5 so that upon rotation of the gear 7 in forward and reverse directions, the table 1 is reciprocated upon the ways 3.

The feed mechanism is preferably actuated directly from the prime mover (not shown) of the machine by means including a horizontally extending shaft 10 which enters through the rear wall of the housing 4 and extends forwardly through the housing and into the forward portion thereof. It is contemplated that during operation of the machine, the shaft 10 will be driven at a constant speed, the feeding mechanism which will now be described being arranged to be driven by this constant speed shaft and to actuate the table 1 at "feed" and "traverse" rates under the manual control of an operator, or the automatic control of dog operated trip devices.

As mentioned hereinbefore, the form of the invention illustrated in the drawings provides a pair of feed-traverse clutches which clutches are preferably arranged each to feed the table in one direction and to traverse the table in the opposite direction. Thus upon the completion of a feeding movement in one direction by the engagement of one clutch member, the actuation of that clutch to its traverse position will return the table at a rapid or traverse rate. The traverse members of the clutches are preferably driven directly from the shaft 10 whereas the feed members are driven through suitable reduction and feed change gearing so as to permit of changing the feed speed.

As shown in the drawings, a pair of feed-traverse clutch members 11 and 12 are rotatably mounted upon parallel shafts 13 and 14 respectively which are supported intermediate the side walls 4ª and 4ᵇ of the housing. The clutch members 11 and 12 are preferably provided with gear teeth formed integrally therewith so as to provide pinions 15 and 16, which pinions mesh with the gear 7 on the feed screw.

To drive the clutch members at traverse speeds, a pair of intermeshing traverse gears 17 and 18 are rotatably mounted on the shafts 13 and 14 respectively, at one end of the clutch members. The gear 17 is driven from the shaft 10 by means of the bevel gear 19, keyed on said shaft, and an intermediate gear having a beveled gear portion 20 meshing with the bevel gear 19 and a pinion portion 21 meshing with the gear 17, said cluster gear being rotatably mounted on a stud 22 secured to the side wall 4ᵇ. The gears 17 and 18 are provided with clutch jaws 23 and 24 arranged to be engaged with traverse clutch jaws 25 and 26 on the clutch members 11 and 12. As will be apparent, the intermeshing gears 17 and 18 are driven in opposite directions.

The opposite ends of the clutch members 11 and 12 are provided with feed clutch teeth 27 and 28 arranged to be engaged with corresponding clutch teeth 29 and 30 formed on a pair of intermeshing feed gears 31 and 32 which are rotatably mounted on the shafts 13 and 14 respectively. These gears are arranged to be driven at feed speeds from the shaft 10 through a pair of pickoff gears 33, 34, shaft 35, worm 36, worm wheel 37, and a gear 38 (Fig. 2) to which the worm wheel is rigidly secured. The pickoff gear 33 is detachably mounted on the forward end of the shaft 10 (Fig. 2) by means of a multiple splined connection and meshes with the pickoff gear 34 which is similarly mounted upon the shaft 35, which shaft is rotatably mounted in the housing 4 by means of a roller bearing 39 and a ball bearing 39ª. The worm 36 is secured to the shaft 35 intermediate said bearings (Fig. 1) and meshes with the worm wheel 37. The gear 38 to which the worm wheel 37 is secured is rotatably mounted on a short shaft 40 which extends transversely of the housing and is mounted intermediate the wall 4ª and a web 4ᶜ. The gear 38 meshes with the feed gear 32. Thus the feed gears 31 and 32 are continuously rotated in opposite directions through the gearing connection with the shaft 10, a detachable cover 41 being provided in front of the pickoff gears so as to permit changing of the gears.

In its preferred form the invention contemplates that the feed gear 31 will be driven in the opposite direction to the corresponding traverse gear 17 so that the clutch member 11 is arranged to be engaged with feed gear 31 to feed the table in one direction (say towards the left of an operator standing in front of the machine) or to be engaged with the traverse gear 17 to traverse the table to the right, and the clutch device 12 is arranged when engaged, to feed the table towards the right (of the same operator) or to rapid traverse the table towards the left.

For controlling the clutch members 11 and 12 the invention contemplates a pair of control devices arranged to permit of manual operation of the clutches as well as automatic actuation thereof and so interlocked that but one of the clutches can be engaged at a time. As illustrated herein these control devices comprise yokes 42 and 43 (Figs. 1, 3 and 4) which yokes are mounted on transversely extending rods 44 and 45 slidably mounted in the side walls of the housing 4. The yoke 42 engages the clutch member 11 and the yoke 43 engages the clutch 12. These yokes are operable by means of a pair of bell crank devices 46 and 47 (Fig. 4) pivotally mounted on vertical studs 48 and 49 secured to the bottom wall of the housing 4, one arm of each bell crank having a pin and slot connection 50 with the rods 44 and 45.

At the front of the housing are mounted two vertical shafts 51 and 52 at the lower ends of which are secured radially extending arms 53 and 54, and at the upper ends of which are mounted manual controls in the form of levers 55 and 56. These control levers are adapted to actuate the clutches 11 and 12 respectively, the arm 53 on the shaft 51 being connected to the bell crank 46 by means of a link 57 and the arm 54 on the shaft 52 being connected to the bell crank 47 by a link 58.

In the exemplary form illustrated herein the gearing is such that the levers 55 and 56 are in the full line positions shown in Fig. 4 when the clutch members 11 and 12 are in their disengaged or neutral positions, and when they are moved to engage the clutches, the levers move in the direction in which the table will move. Thus as shown diagrammatically in Fig. 4, the lever 56 when moved to the dotted line position will effect a traverse movement of the table to the right (viewed from the front of the machine) and when moved towards the left into the dot-dash line position will effect a feed movement of the table toward the left. Similarly the lever 55 when moved to the left into its dotted line position will effect a traverse movement of the table to the left and when moved to the right into the dot-dash line position will effect a feed movement of the table to the right.

As shown most clearly in Figs. 3 and 7, the means for interlocking the control devices to prevent simultaneous engagement of the clutches comprises a collar 59 on the shaft 51 having opposed peripheral notches 60 therein. A transverse slidable interlocking member 61 having a U-shaped portion provided with opposed teeth 62 is mounted so that when moved in either direction from the position shown in Fig. 7 (wherein the shaft 51 is illustrated in its position corresponding to the neutral position of the clutch 11) one of the teeth will enter one of the notches to prevent rotation of the shaft. The other end of the interlocking member has a slot 63 formed therein arranged to receive a pin 64 carried on a collar 65 secured to the shaft 52 of the control for clutch 12. As will be readily apparent from Fig. 7 movement of one of the manual control levers will rotate the corresponding shaft and thereby prevent movement of the other shaft.

In addition to a manual control of the clutches by means of the hand levers 55 and 56 for obtaining certain movements of the clutches, the invention contemplates the provision of trip devices operated automatically during movement of the movable support by means of dogs secured to the support. Preferably these trip devices are adapted to stop the support at the end of a rapid traverse movement in either direction, by shifting the engaged clutch member to neutral, or to cause a rapid traverse movement in the opposite direction at the end of a slow feed movement by shifting the engaged clutch member from its feed to its traverse position.

As illustrated herein, a pair of sleeves 66 and 67 (Figs. 3 and 4) having disk-like upper ends 68 and 69 are mounted on the upper end of the shafts 51 and 52 and arranged for a limited rotary movement relative thereto. These disks have rollers 70 and 71 mounted thereon respectively and adjacent each other (Fig. 4) which rollers are adapted to be engaged by suitable dogs on the table to actuate the clutches. These dogs are generally of two types as shown diagrammatically in Fig. 1ª, a dog 72 being arranged to engage the roller 70 when the clutch 11 is in its feed position and to move the control device towards its neutral position, and a dog 73 being arranged to engage the roller 71 when the clutch 12 is in its traverse position, to move the other control device towards its neutral position. As illustrated in Figs. 3 and 4, the clutches are in neutral, it being apparent that if one of the clutches is moved into either feed or traverse its roller will be moved out from the table or in towards the table from the neutral position shown.

At their lower ends the sleeves 66 and 67 have segmental portions 66ª and 67ª (Figs. 3 and 6) which extend downwardly therefrom. These segmental portions are positioned between pairs of segments 74 and 75 (Fig. 6) which are fitted within cup shaped members 76 formed integrally with the collars 59 and 65. The segments 74 are secured to the cup shaped members by pins 77, the segments 75 being arranged for rotary movement about the shafts 51 and 52 in the space intermediate the segmental portions 66ª and 67ª and the segments 74. The segments 74 and 75 are normally held in their parted positions and in abutment with the two sides of the portions 66ª and 67ª as shown in Fig. 6 by means of coil springs 78 and 79.

The upper disks 68 and 69 are transversely slotted at 80 as shown in Fig. 5ª so as to leave solid portions for the pins on which the rollers 70 and 71 are secured and thereby form abutment walls 80ª (Figs. 5 and 5ª). The levers 55 and 56 are secured to mutilated disks 81 apertured to fit over the shafts 51 and 52 and positioned in said slots, these disks having angular sides 82 and 83 (Fig. 5) arranged to engage the abutment walls 80ª.

Thus due to the relative position of the springs 78 and 79 and the abutment wall 80ª and the sides 82 and 83, the movement of a roller 70 or 71 in a direction to stop the traverse movement of the table will rotate its sleeve 66 to engage the abutment 80ª with the side 82 on the disk 81 so as to positively communicate the motion to the corresponding clutch to disengage the same. Movement of a roller 70 or 71 in a direction to stop the feed movement of the table will, however, be transmitted to the clutch only through a yielding lost motion connection which stores up sufficient power to throw the clutch past its neutral position and into its other operative or return traverse position which causes reversal of movement of the table. Thus during movement of one of the rollers 70 or 71 in a direction to stop the feed movement of the table, the abutment 80ª of the corresponding trip device will first be moved toward the side 83 of the disk 81 and during this approach movement, the segment 66ª or 67ª of the control will move its segment 75 to compress the springs 78 and 79. The abutment 80ª will then engage the side 83 to move the disk 81 and disengage its clutch and upon completion of this disengagement the springs 78 and 79 will expand to throw the clutch into its other engaged position whereby the table will be moved at rapid traverse rate in the opposite direction.

The spring or load and fire devices just described constitute a portion of the means automatically operable to effect a shift of a clutch from its feed position wherein the work support moves at a slow rate in one direction, to its traverse position wherein the support will be given a reverse rapid traverse movement. Thus when it is desired to return the work at the end of the cutting stroke, a single clutch member may be shifted automatically to effect such return movement.

In order to permit of manual operation and of the use of dogs for merely stopping the table whether moving at a feed or traverse rate, the invention contemplates that means will be provided for disabling the automatically operable shift devices so as to prevent automatic reverse movement of the table. As illustrated herein, this disabling means comprises devices for locking the mutilated disks 81 to the disks 68 and 69 of the controls so as to render ineffective the load and fire devices. In the exemplary form of the invention the mutilated disks are preferably secured to the shafts 51 and 52 as by means of pins 84 and may be secured to the disks 68 and 69 by means of locking fingers 85 (Figs. 5ª and 5ᵇ) pivotally mounted on the disks 81 and arranged to engage slots 86 in the disks 68 and 69. When the finger 85 is in the position shown in Fig. 5ª, the disks 68 and 81 are locked together whereas when in the position shown in Fig. 5ᵇ the mutilated disk 81 is released and an automatic shifting of the clutches is attained.

Assuming for purposes of illustration that it is desired to have an operating cycle whereby there is, first, a rapid approach movement of the work to the cutter, second, a feed movement of the work past the cutter, and third, a rapid return movement of the work to its starting position, a traverse dog 73 is positioned opposite the advance end of the work piece (not shown) and traverse clutch 12 is engaged manually by moving the lever 56 to its upper or traverse position indicated in dotted outline in Fig. 4 to cause a rapid movement of the table and work toward the cutter. Engagement of the dog 73 with the roller 71 will positively disengage the clutch 12 and move it to neutral, the abutment wall 80ª then engaging the mutilated disk side 82 to rotate the shaft 52.

The hand lever 55 which controls the clutch 11 is now operable to feed the table in a direction to move the work past the cutter and when shifted to its traverse position will effect a return of the table. The finger 85 of this device is therefore disengaged from its corresponding notch 86. Feeding movement of the table toward the right is manually initiated by movement of the lever 55 to its feed position (counter clock-wise in Figs. 2, 4, 5 and 6), so as to move the clutch 11 to its feed position. At the end of the feeding movement a feed dog 72 is arranged to engage the roller 70 and in so doing the disk 68 and its integral segmental portion 66ª move the segment 75 in a clock-wise direction (Fig. 6) against the action of the springs 78 and 79. During the initial portion of this movement the springs are compressed so that when the clutch is shifted out of its feed position into neutral the springs can expand to move the clutch past its neutral position and into its traverse position. The springs are compressed until the abutment wall 80ª engages the side 83 of the mutilated disk whereupon further movement of the roller 70 serves positively to shift the clutch 11 into neutral. The springs then effect a shift of the clutch 11 to its traverse position. This causes a rapid return movement of the table until a traverse dog 73 engaging the roller 70 causes the segmental portion 66ª to move the segment 74 and correspondingly the clutch, back to its neutral position.

It will be apparent from the foregoing that the invention provides not only a conveniently operable mechanism for controlling the clutches manually but also provides a simplified trip mechanism whereby the engaged clutch may either be shifted from its feed position to neutral or may be shifted to its traverse position. This lends itself particularly for use in connection with the cycle herein outlined wherein it is desired to have a rapid approach movement of the work to the cutter, a feed movement in the same direction and a rapid return movement, although it will be readily apparent to those skilled in the art that with the manual and automatic trip devices illustrated, various other cycles of operation can readily be obtained,

I claim as my invention:

1. In combination with a reciprocating support and actuating mechanism therefore embodying two feed-traverse clutches, a pair of control levers for said clutches interlocked so that but one can be in an operative position at a time, and a dog on said support adapted to shift which ever lever is in an operative position.

2. In combination with a reciprocating support having trip dogs arranged for movement therewith and actuating mechanism for said support embodying a pair of feed-traverse clutches, a pair of control devices for said clutches each having two contact surfaces arranged for engagement by said trip dogs, and means to interlock said devices.

3. The combination with a reciprocating support, of actuating mechanism for feeding and traversing said support embodying a pair of feed-traverse clutches, each of which is effective in its feed position to move the support in the reverse direction from that in which it moves the support when in its traverse position.

4. In combination, a reciprocating support, and actuating mechanism for feeding and traversing said support embodying a pair of feed-traverse clutches, each of which is effective in its feed position to move the support in the reverse direction from that in which it moves the support when in its traverse position, a pair of control devices for said clutches interlocked to prevent simultaneous engagement thereof, and a dog on said support adapted to actuate either device when its clutch is engaged, to disengage the clutch.

5. A feed mechanism for a milling machine table, comprising, in combination, a pair of feed-traverse clutches, gearing between said clutches and the table, a pair of hand levers arranged to actuate said clutches, and means arranged to prevent the simultaneous engagement of said clutches.

6. A feed mechanism for a movable work support comprising, in combination, a pair of feed-traverse clutch devices, gearing between said devices and the support, each of said devices being arranged to feed the support in one direction and to traverse the support in the opposite direction, a pair of control levers for said clutches, and means to prevent the simultaneous engagement of the clutches.

7. A feed change mechanism for a movable support comprising, in combination, a pair of feed-traverse clutch devices, gearing between said devices and the support, a pair of trip devices for controlling said clutch devices, said trip devices each comprising a pair of relatively movable members arranged directly to abut each other when moved in one direction and having a lost motion connection therebetween when moved in the opposite direction.

8. The combination of a movable support, mechanism for actuating said support embodying a first clutch for imparting one movement to the support and a second clutch for imparting another movement to said support, manually operable means for engaging either of said clutches, a trip operated control for said clutches positively operable when moved in one direction to disengage said first clutch, said control having a lost motion connection therein to be taken up when the control is moved in the opposite direction, said control being operable after the taking up of said connection positively to disengage said second clutch, a spring in said control arranged to be compressed during the taking up of said lost motion connection and operable automatically to engage said first clutch immediately upon the disengagement of said second clutch, and means operable to prevent such automatic engagement of said first clutch.

9. The combination of a movable support, mechanism for actuating said support embodying a first clutch for imparting one movement to the support and a second clutch for imparting another movement to said support, manually operable means for engaging either of said clutches, a trip operated control for said clutches positively operable when moved in one direction to disengage said first clutch, said control having a lost motion connection therein to be taken up when the control is moved in the opposite direction, said control being operable after the taking up of said connection positively to disengage said second clutch, a spring in said control arranged to be compressed during the taking up of said lost motion connection and operable automatically to engage said first clutch immediately upon the disengagement of said second clutch.

10. In a machine having a reciprocable support, the combination of actuating mechanism for feeding and traversing said support embodying a feed-traverse clutch arranged when in its feed position to move the support in one direction and when in its traverse position to move the support in the opposite direction, and a control for said clutch adapted for dog actuation in two directions and operable when moved in either direction to move said clutch to its disengaged position, said control having a load and fire device operable when the control is moved in one direction to shift the clutch through its disengaged position, and means to disable said load and fire device to prevent operation thereof.

11. In a machine having a reciprocable support, the combination of actuating mechanism for feeding and traversing said support embodying a feed-traverse clutch arranged when in its feed position to move the support in one direction and when in its traverse position to move the support in the opposite direction, and a control for said clutch adapted for dog actuation in two directions and operable when moved in either direction to move said clutch to its disengaged position, said control having a load and fire device operable when the control is moved in one direction to shift the clutch through its disengaged position.

12. In a machine having a reciprocable support, the combination of mechanism for actuating said support embodying a pair of clutches engageable to impart different movements to said support, a control for said clutches adapted for dog actuation to disengage one of said clutches, a load and fire device in said control operable after disengagement of said clutch to engage the other one of said clutches, and means to disable said load and fire device.

13. The combination of a reciprocable support, mechanism for actuating said support including a first clutch engageable to impart one movement to said support, a second clutch engageable to impart another movement thereto, a dog actuated control for said clutches operable to disengage said clutches, and a load and fire device embodied in said control and operable automatically to engage said second clutch after disengagement of said first clutch by said control.

14. The combination of a reciprocating support, actuating mechanism for said support including a first clutch for obtaining one movement of said support and a second clutch for obtaining another movement thereof, manually operable means for engaging either of said clutches or for disengaging the same, trip operated control mechanism arranged to actuate said manually operable means to disengage either of said clutches, said control mechanism having a lost motion connection to be closed before said first clutch may be disengaged, said connection embodying a load and fire device arranged to be loaded during the closing of said lost motion connection and to move said manual control means to engage said second clutch immediately upon disengagement of said first clutch, and means to prevent loading of said load and fire device.

15. The combination of a reciprocating support, mechanism for actuating said support embodying a feed-traverse clutch device operable in its feed position to move the support at a feed rate in one direction and in its traverse position to move the support at traverse rate in the opposite direction, dog operated control means for said clutch automatically operable when said support is moved at a traverse rate through said clutch to stop said movement and when the support is moved at feed rate through said clutch to shift said clutch to move the support at the traverse rate in the opposite direction, and means for disabling said control means to prevent such reversal of movement of the support.

16. A feed mechanism for a movable support comprising, in combination, a pair of feed-traverse clutch devices, gearing between said devices and the support, said devices being reversely arranged and each being operable to feed the table in one direction and to traverse the table in the opposite direction, and means for automatically operating said clutches to stop a feeding movement of the table in one direction and to initiate traverse movement thereof in the opposite direction.

17. A feed change mechanism for a movable support, comprising, in combination, a feed-traverse clutch device, gearing between said device and said support, said device and said gearing being arranged so that said device may be engaged to feed the support in one direction or to traverse it in the opposite direction, trip means moving with said support, and control means for said clutch engageable by said trip means to stop feeding movement of the support by said device and initiate traverse movement thereby, and to stop traverse movement thereby.

18. A feed change mechanism for a movable support, comprising in combination, a pair of feed-traverse clutch devices, gearing between said devices and the support, a pair of trip devices one for controlling each of said clutches, said trip devices each including a movable member arranged to be moved in one direction to stop feeding movement of the support and in the opposite direction to stop traverse movement of said support.

In testimony whereof, I have hereunto affixed my signature.

GUSTAF DAVID SUNDSTRAND.